United States Patent
Park et al.

(10) Patent No.: US 11,820,340 B2
(45) Date of Patent: Nov. 21, 2023

(54) RESERVOIR FOR BRAKE APPARATUS OF VEHICLE

(71) Applicant: HYUNDAI MOBIS CO., LTD., Seoul (KR)

(72) Inventors: Si Woo Park, Yongin-si (KR); Ji Ho Yoo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/964,342

(22) Filed: Oct. 12, 2022

(65) Prior Publication Data

US 2023/0192052 A1 Jun. 22, 2023

(30) Foreign Application Priority Data

Dec. 21, 2021 (KR) .......................... 10-2021-0184322

(51) Int. Cl.
*B60T 11/26* (2006.01)
*B60T 13/14* (2006.01)
*B60T 17/06* (2006.01)

(52) U.S. Cl.
CPC ............... *B60T 11/26* (2013.01); *B60T 13/14* (2013.01); *B60T 17/06* (2013.01)

(58) Field of Classification Search
CPC ........ B60T 11/26; B60T 13/14; B60T 13/148; B60T 17/06
See application file for complete search history.

(56) References Cited

U.S. PATENT DOCUMENTS

| 2,625,267 | A | * | 1/1953 | Alexander | B60T 11/26 180/90 |
| 4,441,520 | A | * | 4/1984 | Bruso | G05D 9/02 137/453 |
| 4,505,113 | A | * | 3/1985 | Reinartz | B60T 17/225 60/592 |
| 6,840,044 | B2 | * | 1/2005 | Leboisne | B60T 17/06 60/585 |
| 2004/0207250 | A1 | * | 10/2004 | Porchet | B60T 11/26 303/1 |
| 2011/0265469 | A1 | * | 11/2011 | Mouri | B60T 11/26 220/501 |

(Continued)

FOREIGN PATENT DOCUMENTS

DE 102013213282 A1 * 1/2015
EP 1184247 A1 * 3/2002

(Continued)

*Primary Examiner* — Thomas E Lazo

(74) *Attorney, Agent, or Firm* — NovoTechIP International PLLC

(57) ABSTRACT

Disclosed are a reservoir for a brake apparatus of a vehicle. The reservoir includes a first reservoir tank, a second reservoir tank formed to be spaced apart from the first reservoir tank and provided with a port portion for supplying a brake fluid to the first reservoir tank, and a connection hose configured to connect the port portion to the first reservoir tank so that the brake fluid of the second reservoir tank is transferred to the first reservoir tank, wherein the port portion includes a first port unit protruding to the inside of the second reservoir tank and a second port unit protruding to the outside of the second reservoir tank.

12 Claims, 9 Drawing Sheets

(56) References Cited

U.S. PATENT DOCUMENTS

2015/0275926 A1* 10/2015 Kobori .................... B60T 11/26
  220/562
2018/0345943 A1* 12/2018 Kim ........................ B60T 11/26
2019/0120421 A1*  4/2019 Ohnishi ................. F16M 13/02

FOREIGN PATENT DOCUMENTS

EP          2407362 A2 *  1/2012
KR     1020180128630 A    12/2018
WO        WO-9917967 A1 *  4/1999

* cited by examiner

RESERVOIR FOR BRAKE APPARATUS OF VEHICLE

CROSS-REFERENCE TO RELATED APPLICATIONS

This application claims the benefit of priority under 35 USC § 119(a) to Korean Patent Applications No. 10-2021-0184322, filed on Dec. 21, 2021, the disclosure of which is incorporated herein by reference in its entirety.

TECHNICAL FIELD

Exemplary embodiments of the present disclosure relate to a reservoir for a brake apparatus of a vehicle, and more particularly, to a reservoir for a brake apparatus of a vehicle capable of preventing a reverse flow of a brake fluid caused by a biasing of the brake fluid during deceleration and acceleration or turning of the vehicle.

BACKGROUND

In the case of an electric vehicle to which an electronic brake system is applied, a front trunk is applied into an engine room thereof. As the space in the engine room where parts constituting the brake system is installed becomes narrow due to the front trunk, a remote-type reservoir, which is dualized into a main reservoir tank assembled to a master cylinder and a remote reservoir tank connected by a hose, is mounted on the vehicle instead of a reduction in the size of a reservoir tank that supplies a brake fluid to the master cylinder.

FIG. 1 is a perspective view illustrating a conventional remote-type reservoir, and FIG. 2 is a cross-sectional view illustrating the remote-type reservoir illustrated in FIG. 1.

Referring to FIGS. 1 and 2, the conventional remote-type reservoir is disposed with a vertical distance L1 and a horizontal distance L2 between a main reservoir tank 10 and a remote reservoir tank 20. In such a disposition structure, a brake fluid in the main reservoir tank 10 may flow back into the remote reservoir tank 20 due to a biasing of the brake fluid that occurs when a vehicle is decelerated and accelerated or turned left and right.

In particular, as the vertical distance L1 between the main reservoir tank 10 and the remote reservoir tank 20 decreases and the horizontal distance L2 therebetween increases, such a backflow phenomenon increases. In addition, there is a problem in that brake performance of the vehicle deteriorates due to a decrease in the brake fluid in the main reservoir tank 10 because the backflow phenomenon further increases when the vehicle is decelerated and accelerated rapidly or turned continuously.

The background art of the present disclosure is disclosed in Korean Patent Application Laid-Open No. 10-2018-0128630 published on Dec. 4, 2018 and entitled "Reservoir Assembly for Brake System".

SUMMARY

Various embodiments are directed to a reservoir for a brake apparatus of a vehicle capable of preventing a reverse flow of a brake fluid caused by a biasing of the brake fluid during deceleration and acceleration or turning of the vehicle.

In an embodiment, a reservoir for a brake apparatus of a vehicle may include: a first reservoir tank; a second reservoir tank spaced apart from the first reservoir tank and provided with a port portion for supplying a brake fluid to the first reservoir tank; and a connection hose configured to connect the port portion to the first reservoir tank so that the brake fluid of the second reservoir tank is transferred to the first reservoir tank, wherein the port portion includes a first port unit protruding to the inside of the second reservoir tank and a second port unit protruding to the outside of the second reservoir tank.

The reservoir for a brake apparatus of a vehicle may further include a fluid reserving portion formed inside the second reservoir tank, wherein the brake fluid is pooled in the fluid reserving portion, and one end of the first port unit is disposed in the fluid reserving portion in a state of being submerged in the brake fluid.

The fluid reserving portion may include: a first rib extending from an inner surface of the second reservoir tank, spaced apart from the first port unit, and formed on one side of the first port unit; a second rib extending from the first rib, spaced apart from the first port unit, and formed to face one end of the first port unit; a third rib extending from the second rib, spaced apart from the first port unit, and formed on the other side of the first port unit; and a passage between a free end of the third rib and the inner surface of the second reservoir tank and through which the brake fluid flows.

The first rib and the third rib may surround the first port unit in a position facing each other, and the second rib may surround one end of the first port unit while connecting the first rib to the third rib.

The second reservoir tank may include: an upper body having an inlet through which the brake fluid is injected; and a lower body coupled to the upper body, having the port portion, and configured to reserve the brake fluid.

The third rib may be formed to extend from an inner surface of the lower body to an inner upper surface of the upper body, the passage may have an upper end spaced apart from the inner upper surface of the upper body, and the brake fluid may flow through a gap between the passage and the inner upper surface of the upper body.

The second reservoir tank may have a partition wall configured to divide an interior of the second reservoir tank into a plurality of spaces.

According to the embodiment of the present disclosure, a reservoir for a brake apparatus of a vehicle has a port portion, which is formed to protrude to the inside of a second reservoir tank, and a fluid reserving portion, which completely surrounds the periphery of the port portion so that the port portion is submerged in a brake fluid at all times and is not exposed. Therefore, it is possible to prevent a reverse flow of the brake fluid in which the brake fluid of a first reservoir tank flows back into the second reservoir tank while an opening of the port portion is exposed, due to a biasing of the brake fluid that occurs when the vehicle is decelerated and accelerated or turns left and right.

Effects of the present disclosure are not limited to the aforementioned effects, and may include various effects within a range evident to those skilled in the art from the following description.

DETAILED DESCRIPTION

Figure 1:
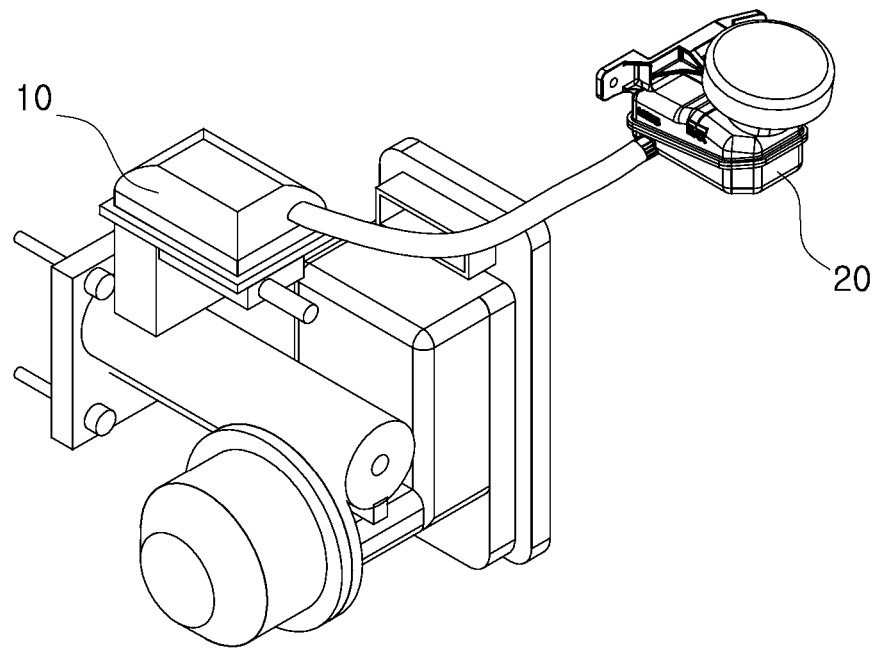
FIG. 1 is a perspective view illustrating a conventional remote-type reservoir.
Figure 2:
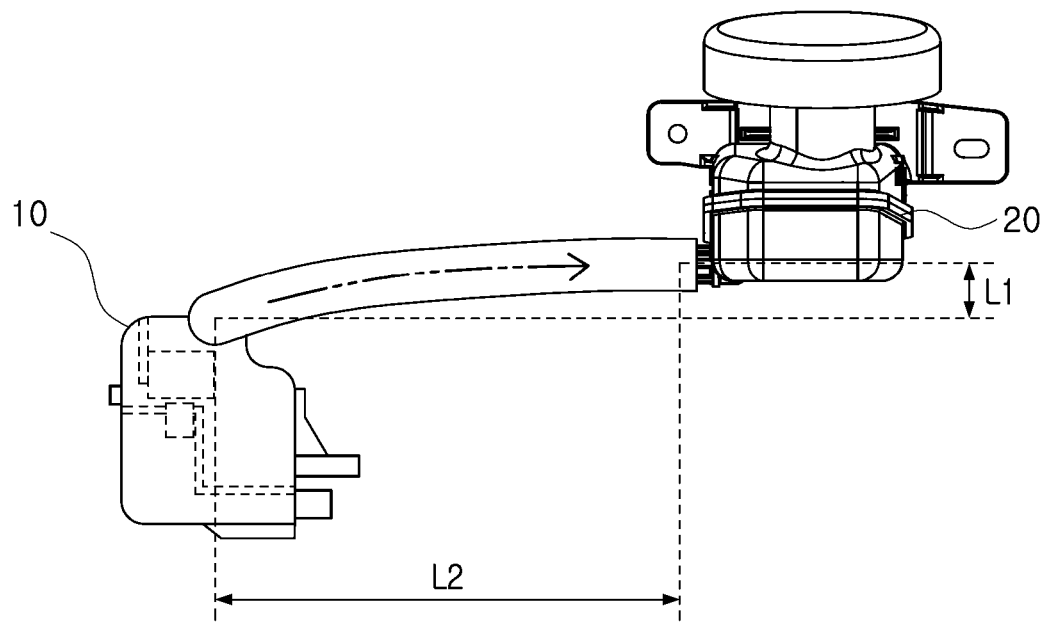
FIG. 2 is a cross-sectional view illustrating the remote-type reservoir illustrated in FIG. 1.

Hereinafter, a reservoir for a brake apparatus of a vehicle will be described in detail with reference to the accompanying drawings through various exemplary embodiments. In such a process, the thicknesses of lines or the sizes of elements illustrated in the drawings may have been exaggerated for the clarity of a description and for convenience' sake. Terms to be described below have been defined by taking into consideration their functions in the present disclosure, and may be changed depending on a user or operator's intention or practice. Accordingly, such terms should be defined based on the overall contents of this specification.

Figure 3:
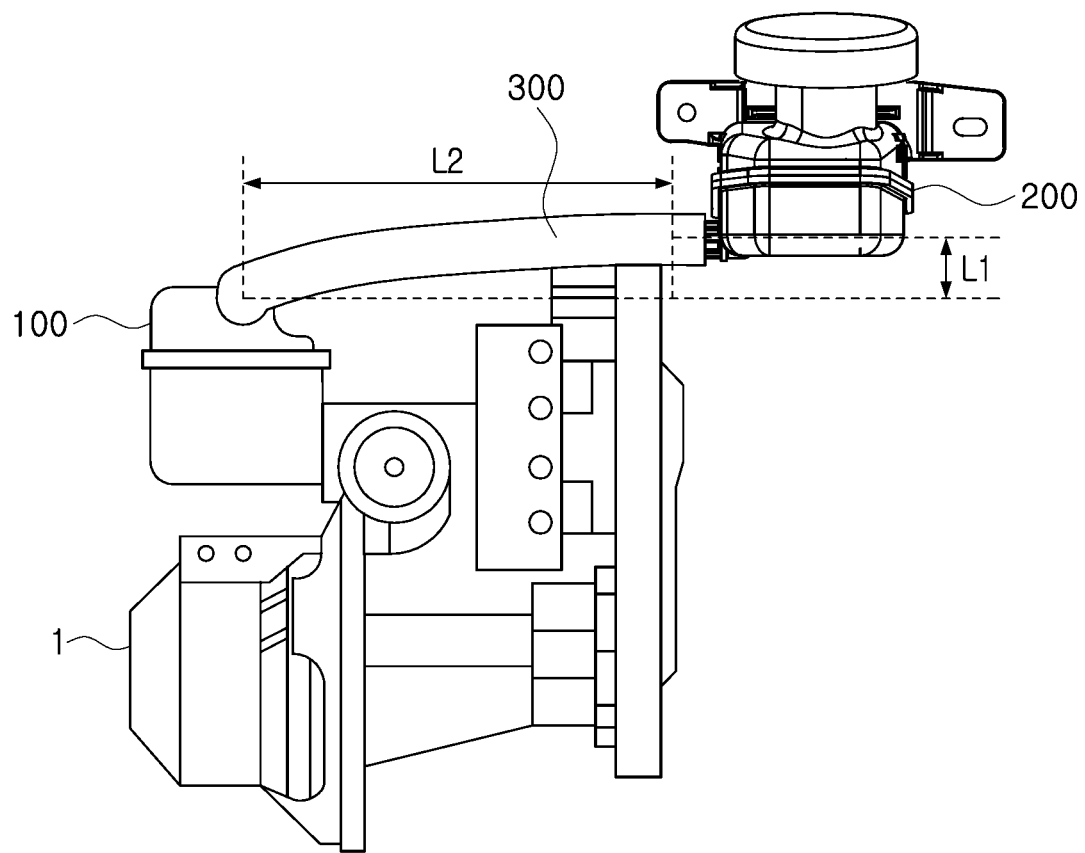
FIG. 3 is a perspective view illustrating a reservoir for a brake apparatus of a vehicle according to an embodiment of the present disclosure.
Figure 4A:
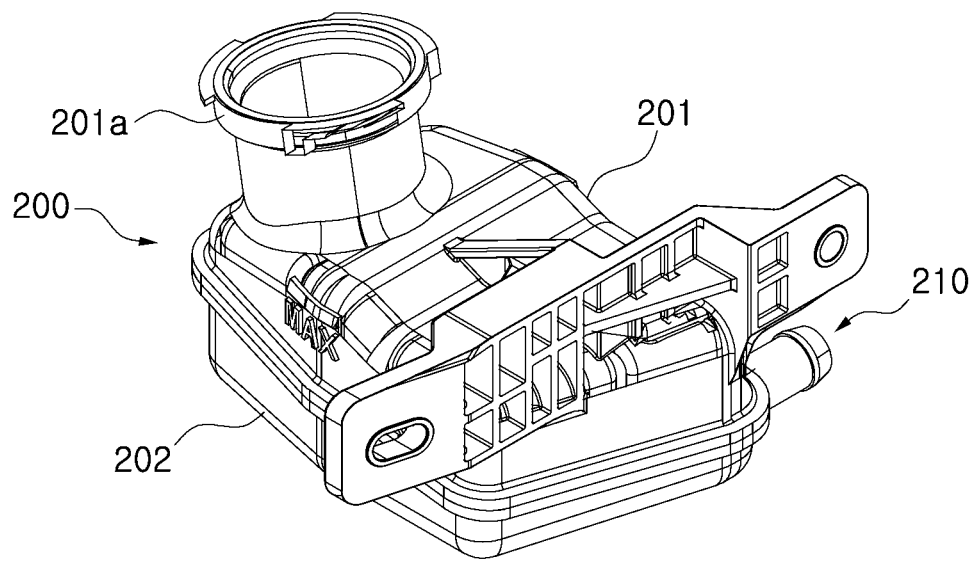
FIGS. 4A and 4B are a perspective view illustrating a second reservoir tank in the reservoir for a brake apparatus of a vehicle according to an embodiment of the present disclosure.
Figure 4B:
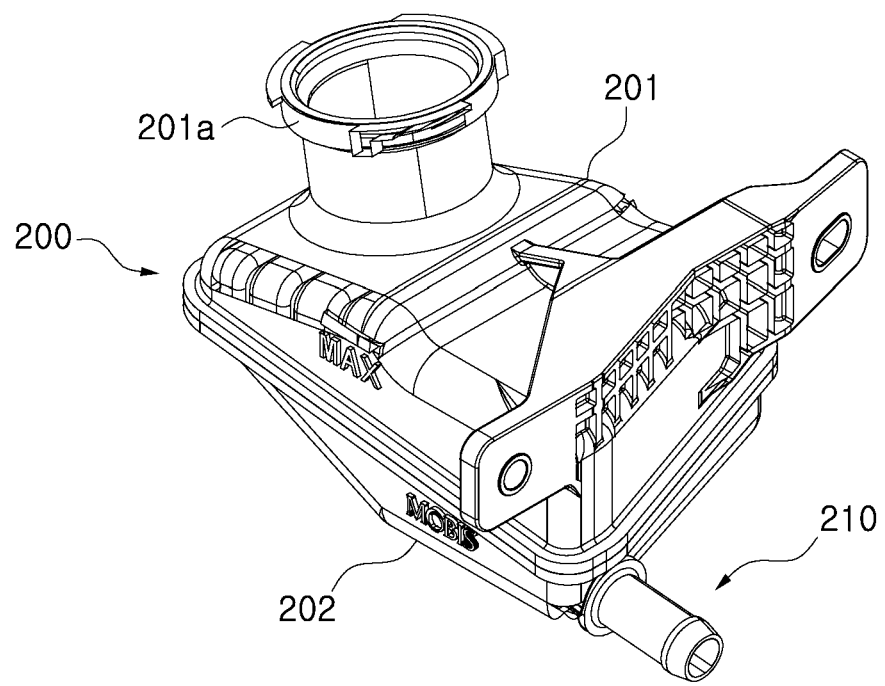
Figure 5A:
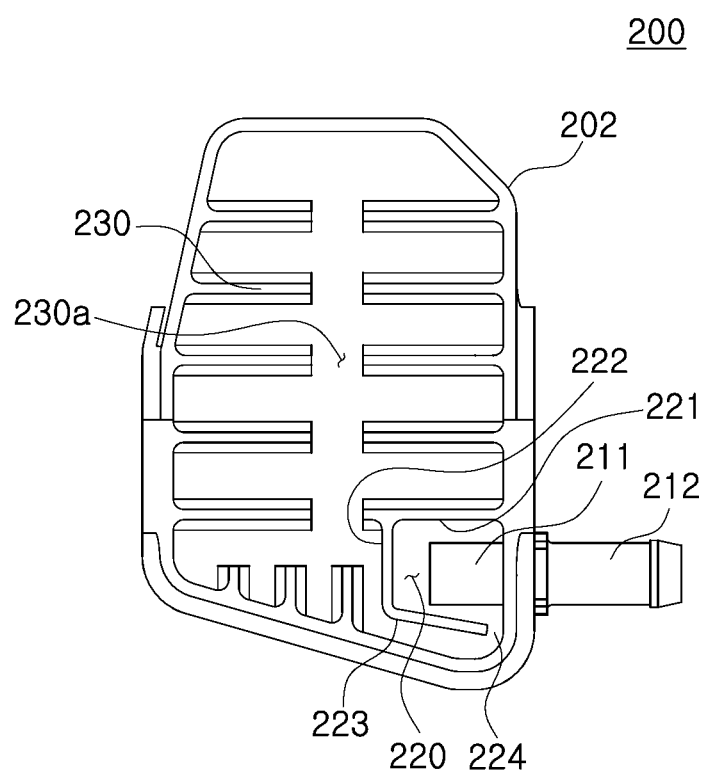
FIGS. 5A and 5B are a cross-sectional view illustrating the second reservoir tank illustrated in FIGS. 4A and 4B
Figure 5B:
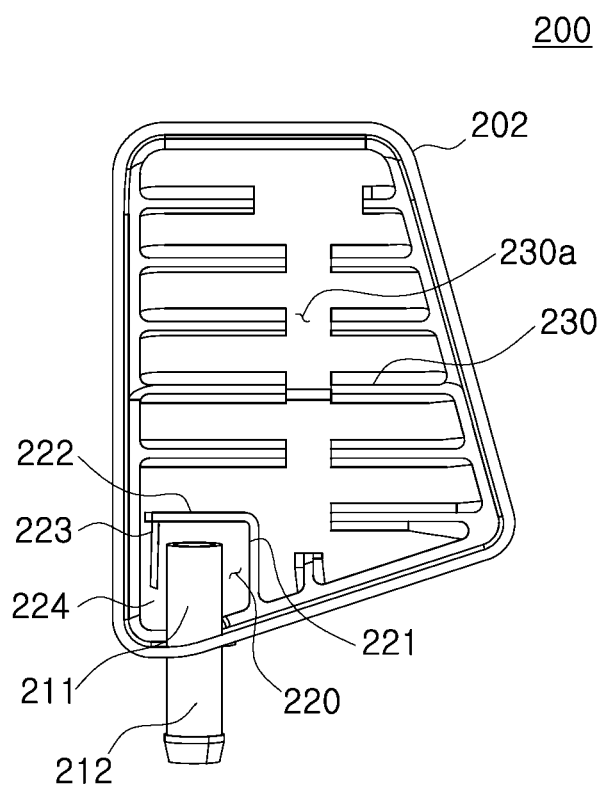
Figure 6:
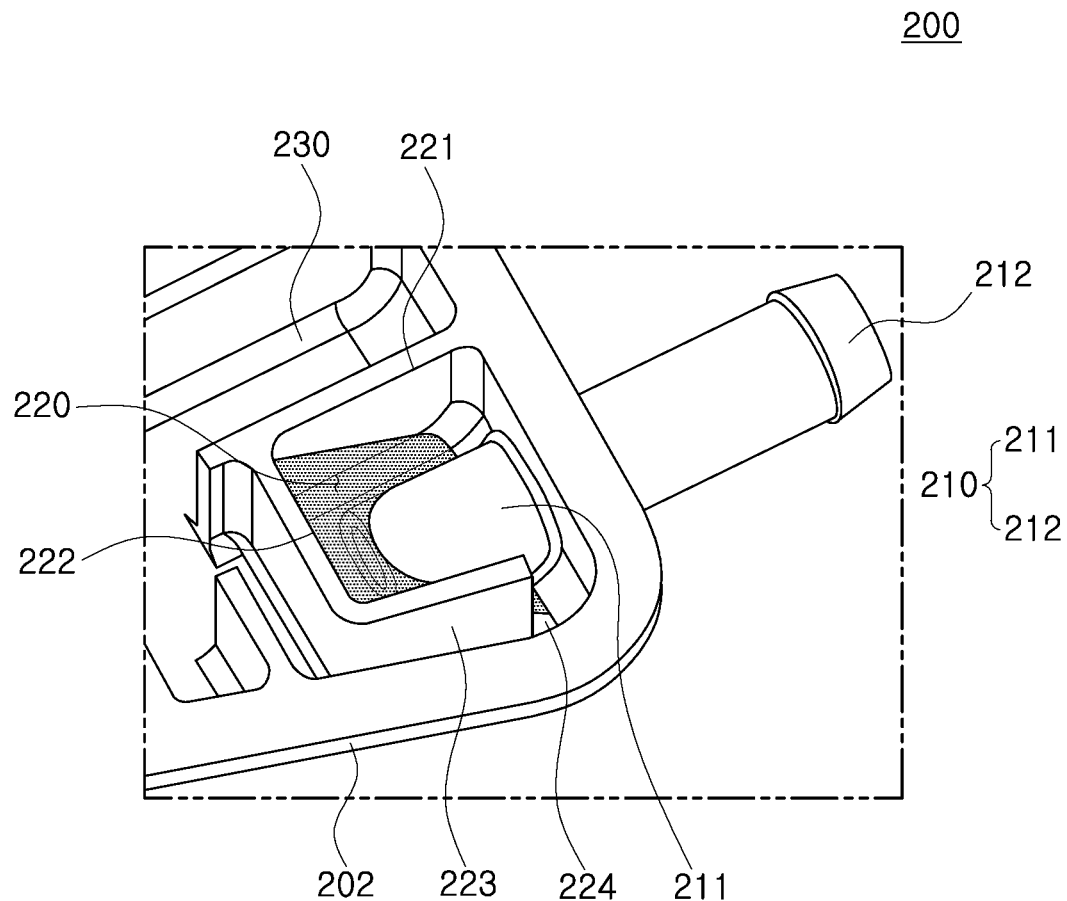
FIG. 6 is a partially enlarged view illustrating the second reservoir tank illustrated in FIGS. 5A and 5B FIGS. 7 and 8 are exemplary views illustrating directions of ribs formed in the second reservoir tank in the reservoir for a brake apparatus of a vehicle according to an embodiment of the present disclosure.

FIG. 3 is a perspective view illustrating a reservoir for a brake apparatus of a vehicle according to an embodiment of the present disclosure, FIGS. 4A and 4B are a perspective view illustrating a second reservoir tank in the reservoir for a brake apparatus of a vehicle according to an embodiment of the present disclosure, FIGS. 5A and 5B are a cross-sectional view illustrating the second reservoir tank illustrated in FIGS. 4A and 4B, and FIG. 6 is a partially enlarged view illustrating the second reservoir tank illustrated in FIGS. 5A and 5B.

Referring to FIGS. 3 to 6, the reservoir for a brake apparatus of a vehicle according to an embodiment of the present disclosure includes a first reservoir tank 100, a second reservoir tank 200 and a connection hose 300.

The first reservoir tank 100 may be coupled to an upper portion of a master cylinder 1 that generates brake fluid pressure. The master cylinder 1 generates the fluid pressure as a piston provided therein moves forward according to a pressing force of a brake pedal, and the generated fluid pressure is provided to a wheel cylinder (not illustrated) to brake.

A space for storing a brake fluid supplied to the master cylinder 1 is formed in the first reservoir tank 100. The brake fluid supplied to the master cylinder 1 is stored in the inner space of the first reservoir tank 100.

The second reservoir tank 200 is disposed to be spaced apart from the first reservoir tank 100, and is provided at an outer upper portion of the first reservoir tank 100. The first reservoir tank 100 and the second reservoir tank 200 are disposed to be spaced apart with a vertical distance L1 and a horizontal distance L2. In other words, the second reservoir tank 200 is spaced apart from the first reservoir tank 100 by a predetermined interval, and provided on an upper right, upper left or front side of the first reservoir tank 100.

A space for storing the brake fluid supplied to the first reservoir tank 100 is formed in the second reservoir tank 200. The brake fluid supplied to the first reservoir tank 100 is stored in the inner space of the second reservoir tank 200.

The second reservoir tank 200 may include an upper body 201 and a lower body 202. Each of the upper body 201 and the lower body 202 may be injection-molded. The upper body 201 and the lower body 202 are coupled by heat sealing.

The second reservoir tank 200 may have a partition wall 230 configured to divide the interior thereof into a plurality of spaces. In other words, a plurality of partition walls (not illustrated) may be formed to be spaced apart from one another in a vertical direction of the upper body 201, and a plurality of partition walls 230 may be formed to be spaced apart from one another in the vertical direction of the lower body 202. The plurality of spaces partitioned by each of the partition wall 230 communicate with one another, and form a passage 230a through which the brake fluid flows.

An inlet 201a through which the brake fluid is injected may be formed on an outer surface of the upper body 201. The inlet 201a may be formed in a cylindrical shape, and the inside of the inlet 201a may be opened to form a passage through which the brake fluid is injected. The upper body 201 may be injection-molded integrally with the partition wall and the inlet 201a. A detachable reservoir cap (not illustrated) may be mounted on an upper side of the inlet 201a.

When the reservoir cap is mounted on the upper side of the inlet 201a, the inlet 201a may be closed, thereby preventing air and foreign substances from flowing into the second reservoir tank 200. When the reservoir cap is separated from the inlet 201a, the brake fluid may be supplied into the second reservoir tank 200.

The lower body 202 is coupled to the upper body 201, the brake fluid is stored in the lower body 202, and a port portion 210 for supplying the brake fluid to the first reservoir tank 100 is formed. The lower body 202 may be integrally injection-molded with the partition wall 230 and the port portion 210. The port portion 210 may be formed near one edge of the lower body 202.

The port portion 210 may be formed in a lateral direction of the lower body 202 as illustrated in FIGS. 4A and 5A depending on design, and may be formed in a front-rear direction of the lower body 202 as illustrated in FIGS. 4B and 5B.

The port portion 210 may include a first port unit 211 and a second port unit 212.

The first port unit 211 is formed to protrude inwardly toward the inside of the second reservoir tank 200 by a predetermined length.

The second port unit 212 is formed to protrude outwardly from the second reservoir tank 200 by a predetermined length.

The connection hose 300 forms a passage of the brake fluid, which extends between and connects the second port unit 212 and the first reservoir tank 100 so that the brake fluid of the second reservoir tank 200 is transferred to the first reservoir tank 100. In addition, one end of the connection hose 300 is coupled to the port portion 210 of the second reservoir tank 200, and the other end of the connection hose 300 is coupled to a port portion of the first reservoir tank 100.

The reservoir for a brake apparatus of a vehicle further includes a fluid reserving portion 220. The fluid reserving portion 220 is formed inside the second reservoir tank 200, and is a portion in which the brake fluid is pooled. As the brake fluid is pooled in the fluid reserving portion 220, one end of the first port unit 211 disposed in the fluid reserving portion 220 is submerged in the brake fluid at all times.

Accordingly, the one end of the first port unit 211 is not exposed to the air while being submerged in the brake fluid.

That is, the one end of the first port unit 211 is in a non-exposed state by the brake fluid.

The fluid reserving portion 220 may include a first rib 221, a second rib 222, a third rib 223 and a passage 224.

The first rib 221 extends from an inner surface of the second reservoir tank 200, and is formed to be spaced apart from the first port unit 211. The first rib 221 extends in a direction parallel to a longitudinal direction of the first port unit 211 from an inner surface of the lower body 202 of the second reservoir tank 200, and extends in an upward direction from a bottom surface of the lower body 202. In this case, the first rib 221 may be formed to extend to an inner upper surface of the upper body 201.

The second rib 222 extends from the first rib 221, and is formed to be spaced apart from the first port unit 211 and face one end of the first port unit 211. The second rib 222 extends in a vertical direction from one end of the first rib 221. When the first rib 221 extends in the longitudinal direction of the first port unit 211, the second rib 222 extends in a direction perpendicular to the longitudinal direction of the first port unit 211. In this case, the second rib 222 may be formed to extend from the inner surface of the lower body 202 to the inner upper surface of the upper body 201.

The third rib 223 extends from the second rib 222, and is formed to be spaced apart from the first port unit 211 and to be opposite to the first rib 221. The third rib 223 is bent from one end of the second rib 222 toward the inner surface of the lower body 202 in which the first unit 211 is disposed, and a free end of the third rib 223 extends toward the inner surface of the lower body 202 so as to be close to the inner surface of the lower body 202. The third rib 223 is formed to extend parallel to the first rib 221 or to have a predetermined angle with respect to the first rib 221. In this case, the third rib 223 may be formed to extend from the inner surface of the lower body 202 to the inner upper surface of the upper body 201.

In the present embodiment, the first rib 221, the second rib 222 and the third rib 223 have a C shape or a U shape as a whole. The first rib 221 and the third rib 223 surround the first port unit 211 in a position facing each other, and the second rib 222 surrounds the first port unit 211 while connecting the first rib 221 and the third rib 223 to each other and being disposed to face one end of the first port unit 211.

The passage 224, which is a passage through which the brake fluid flows between the inner space of the second reservoir tank 200 and the first port unit 211, is formed between the free end of the third rib 223 and the inner surface of the second reservoir tank 200. Since the passage 224 is formed, the fluid reserving portion 220 does not have a completely closed structure, but has a partially opened structure so that the flow of the brake fluid does not deteriorate.

That is, as an upper end of the passage 224 is spaced apart from the inner upper surface of the upper body 201, the brake fluid flows through a gap between the passage 224 and the inner upper surface of the upper body 201.

In addition, since the passage 224 is formed close to the inner surface of the second reservoir tank 200, a narrow passage is formed between the third rib 223 and the inner surface of the second reservoir tank 200, which makes it possible not to affect the flow of the brake fluid, and a sudden flow of the brake fluid during deceleration and acceleration or left and right turns of the vehicle is suppressed so that the brake fluid may be pooled in the fluid reserving portion 220 at all times.

Figure 7:
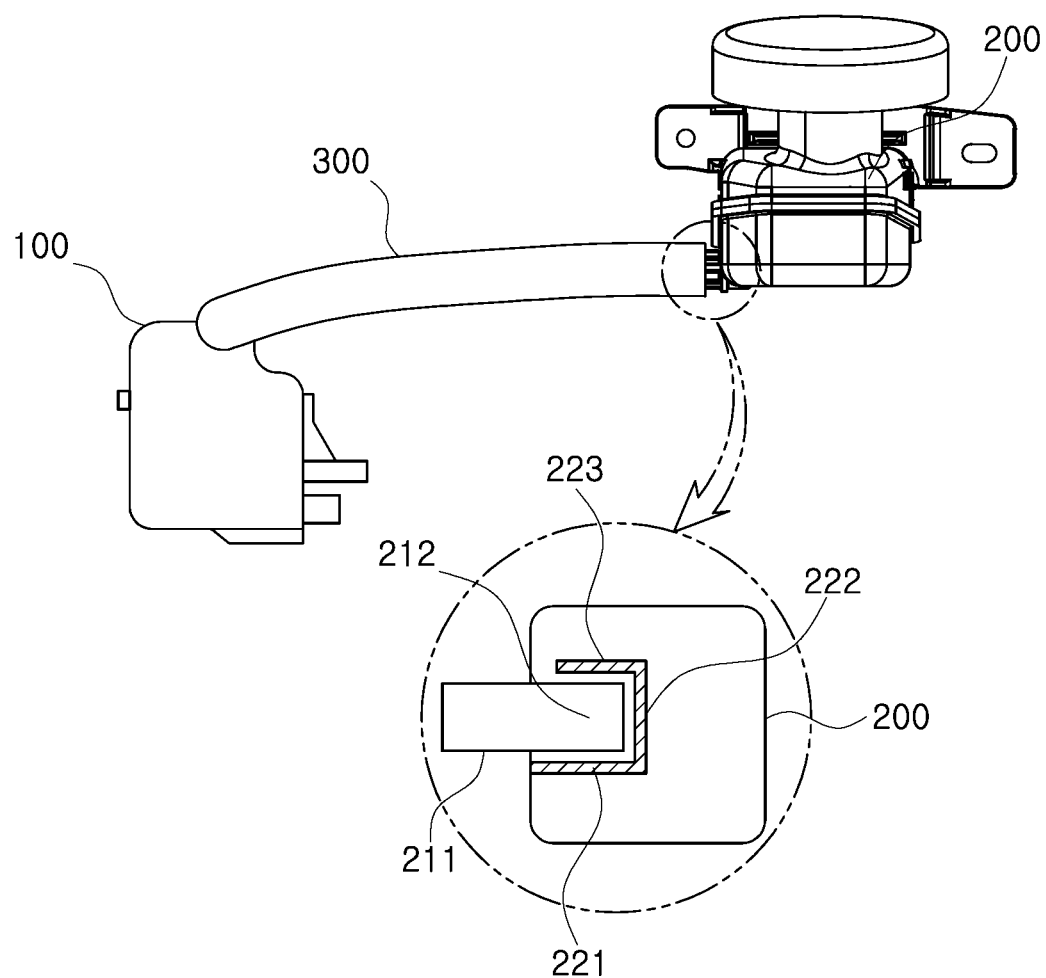

FIG. 7 is an exemplary view illustrating directions of ribs formed in the second reservoir tank 200 in the reservoir for a brake apparatus of a vehicle according to an embodiment of the present disclosure. For convenience in description, FIG. 7 is a cross-section of the second reservoir tank 200 as viewed from the front of the vehicle.

Referring to FIG. 7, when the second reservoir tank 200 is positioned on the upper right side of the first reservoir tank 100, the port portion 210 is formed on a left side of the second reservoir tank 200. In this structure, the brake fluid of the first reservoir tank 100 may flow back into the second reservoir tank 200 when the vehicle turns right.

In order to prevent the reverse flow of the brake fluid, the first rib 221, the second rib 222 and the third rib 223 completely surround the periphery of the first port unit 211 so that the first port unit 211 is submerged in the brake fluid at all times. Accordingly, since the brake fluid is drawn to one side when the vehicle is decelerated and accelerated or turns left and right, an opening of the first port unit 211 is exposed, and thus the brake fluid of the first reservoir tank 100 is prevented from flowing back into the second reservoir tank 200.

Figure 8:
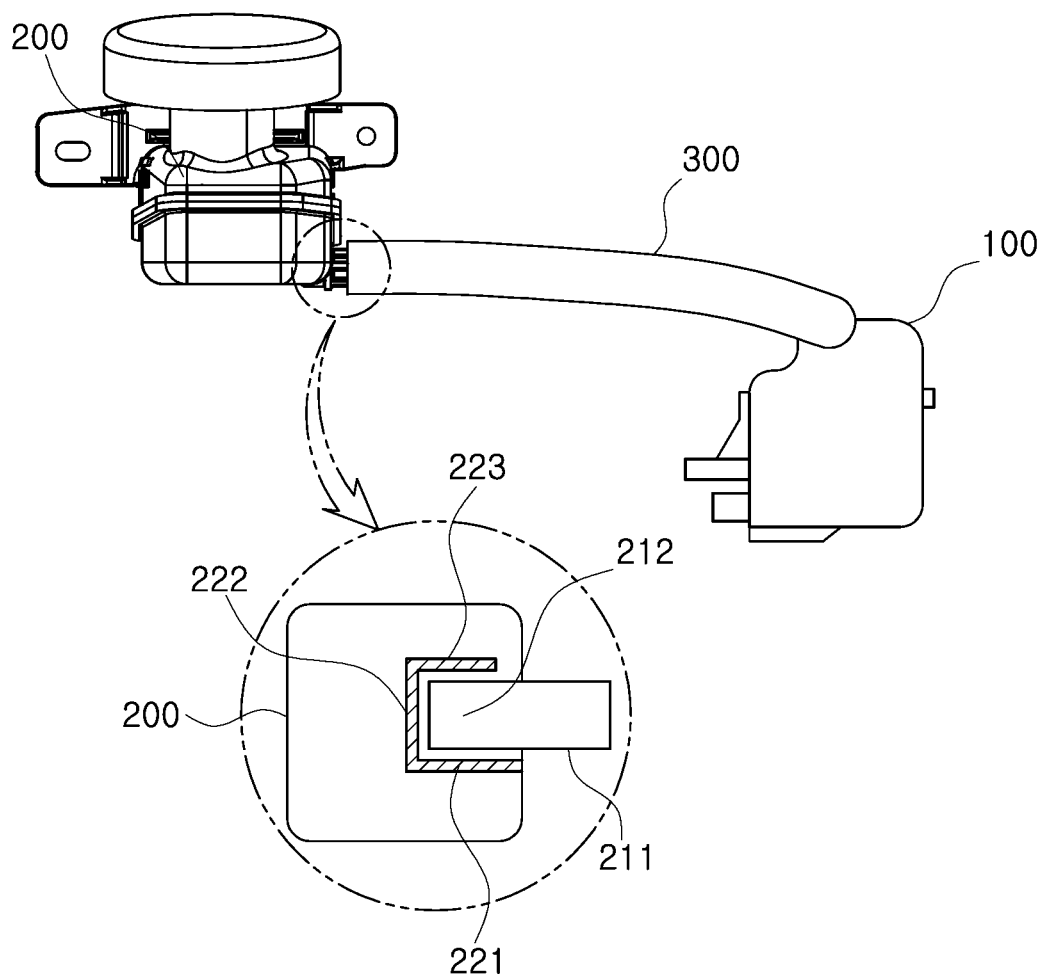

FIG. 8 is an exemplary view illustrating directions of ribs formed in the second reservoir tank 200 in the reservoir for a brake apparatus of a vehicle according to an embodiment of the present disclosure. For convenience in description, FIG. 8 is a cross-section of the second reservoir tank 200 as viewed from the front of the vehicle.

Referring to FIG. 8, when the second reservoir tank 200 is positioned on an upper left side of the first reservoir tank 100, the port portion 210 is formed on a right side of the second reservoir tank 200. In this structure, the brake fluid of the first reservoir tank 100 may flow back into the second reservoir tank 200 when the vehicle turns left.

In order to prevent the reverse flow of the brake fluid, the first rib 221, the second rib 222 and the third rib 223 completely surround the periphery of the first port unit 211 so that the first port unit 211 is submerged in the brake fluid at all times. Accordingly, it is possible to prevent a reverse flow of the brake fluid in which the brake fluid of the first reservoir tank 100 flows back into the second reservoir tank 200 while an opening of the first port unit 211 is exposed, due to the biasing of the brake fluid that occurs when the vehicle is decelerated and accelerated or turns left and right.

According to the embodiments of the present disclosure, the reservoir for a brake apparatus of a vehicle has the port portion 210, which is formed to protrude to the inside of the second reservoir tank 200, and the fluid reserving portion 220, which completely surrounds the periphery of the port portion 210 so that the port portion 210 is submerged in the brake fluid at all times and is not exposed. Therefore, it is possible to prevent a reverse flow of the brake fluid in which the brake fluid of the first reservoir tank 100 flows back into the second reservoir tank 200 while an opening of the first port unit 211 is exposed, due to the biasing of the brake fluid that occurs when the vehicle is decelerated and accelerated or turns left and right.

The present disclosure has been described above with reference to the embodiments illustrated in the accompanying drawings, but the embodiments are merely for illustrative purposes. A person having ordinary knowledge in the art to which the present disclosure pertains will understand that various modifications and other equivalent embodiments are possible from the embodiments. Accordingly, the true technical scope of the present disclosure should be defined by the following claims.

What is claimed is:

1. A reservoir for a brake apparatus of a vehicle, comprising:

a first reservoir tank;
a second reservoir tank spaced apart from the first reservoir tank and including a port portion; and
a connection hose extending between the port portion of the second reservoir to the first reservoir tank,
wherein:
the port portion of the second reservoir tank includes a first port unit protruding inwardly toward an inside of the second reservoir tank and a second port unit protruding outwardly from the second reservoir tank,
the second reservoir tank includes a rib structure defining a fluid reserving portion in an interior of the second reservoir tank, spaced apart from an internal end of the first port unit, the fluid reserving portion being configured to allow brake fluid inputted into the second reservoir tank to be pooled in the fluid reserving portion,
the internal end of the first port unit is disposed at the fluid reserving portion and is configured to be submerged in the brake fluid pooled at the fluid reserving portion, and
the rib structure includes a passage-defining rib spaced apart from the internal end of the first port unit and apart from a lower interior surface of the second reservoir tank to provide a fluid conduction passage between the fluid reserving portion and a portion of the interior of the second reservoir tank outside of the fluid reserving portion.

2. The reservoir of claim 1, wherein:
the rib structure includes:
    a first rib extending from an inner surface of the second reservoir tank, spaced apart from the first port unit, and facing a first side of the first port unit;
    a second rib extending from the first rib, spaced apart from the first port unit, and facing the end of the first port unit; and
    the passage-defining rib extending from the second rib, spaced apart from the first port unit, and facing a second side of the first port unit, and
the brake fluid is guided to flow through a passage between a free end of the passage-defining rib and the inner surface of the second reservoir tank.

3. The reservoir of claim 2, wherein the first, second and passage-defining ribs are disposed to collectively surround the end of the first port unit.

4. The reservoir of claim 2, wherein the second reservoir tank includes:
an upper body having an inlet; and
a lower body coupled to the upper body, having the port portion, and configured to reserve the brake fluid.

5. The reservoir of claim 4, wherein:
the passage-defining rib extends from an inner surface of the lower body to an inner upper surface of the upper body, and
an upper end of the passage is spaced apart from the inner upper surface of the upper body.

6. The reservoir of claim 1, wherein the second reservoir tank has a partition wall dividing an interior of the second reservoir tank into a plurality of spaces.

7. A reservoir for a brake apparatus of a vehicle, comprising:
a first reservoir tank;
a second reservoir tank spaced apart from the first reservoir tank and including a port portion; and
a connection hose extending between the port portion of the second reservoir to the first reservoir tank,
wherein the port portion of the second reservoir tank includes a first port unit protruding inwardly toward an inside of the second reservoir tank and a second port unit protruding outwardly from the second reservoir tank,
wherein:
the second reservoir tank comprises a fluid reserving portion at which brake fluid is pooled,
the first port unit has an end disposed at the fluid reserving portion and submerged in the brake fluid pooled at the fluid reserving portion,
the fluid reserving portion includes:
    a first rib extending from an inner surface of the second reservoir tank, spaced apart from the first port unit, and facing a first side of the first port unit;
    a second rib extending from the first rib, spaced apart from the first port unit, and facing the end of the first port unit; and
    a third rib extending from the second rib, spaced apart from the first port unit, and facing a second side of the first port unit, and
the brake fluid is guided to flow through a passage between a free end of the third rib and the inner surface of the second reservoir tank.

8. The reservoir of claim 7, wherein the first, second and third ribs are disposed to collectively surround the end of the first port unit.

9. The reservoir of claim 7, wherein the second reservoir tank includes:
an upper body having an inlet; and
a lower body coupled to the upper body, having the port portion, and configured to reserve the brake fluid.

10. The reservoir of claim 9, wherein:
the third rib extends from an inner surface of the lower body to an inner upper surface of the upper body, and
an upper end of the passage is spaced apart from the inner upper surface of the upper body.

11. A reservoir for a brake apparatus of a vehicle, comprising:
a first reservoir tank;
a second reservoir tank spaced apart from the first reservoir tank and including a port portion; and
a connection hose extending between the port portion of the second reservoir to the first reservoir tank,
wherein the port portion of the second reservoir tank includes a first port unit protruding inwardly toward an inside of the second reservoir tank and a second port unit protruding outwardly from the second reservoir tank, and
wherein the second reservoir tank has a plurality of partition walls spaced vertically spaced from one another in the interior of the second reservoir tank and located above the first port unit to divide an interior of the second reservoir tank into a plurality of spaces.

12. The reservoir of claim 11, wherein each of the partition walls includes an opening configured to allow the plurality of spaces to be in fluid communication with one another.

* * * * *